(12) United States Patent
Yamamoto

(10) Patent No.: US 11,504,933 B2
(45) Date of Patent: Nov. 22, 2022

(54) PRESSING APPARATUS THAT DETECTS ABNORMAL PRESSING THROUGH EXPANDING AND CONTRACTING INFORMATION OVER TIME OR POSITION

(71) Applicant: JANOME SEWING MACHINE CO., LTD., Tokyo (JP)

(72) Inventor: Yosuke Yamamoto, Ebina (JP)

(73) Assignee: JANOME SEWING MACHINE CO., LTD., Tokyo (JP)

(*) Notice: Subject to any disclaimer, the term of this patent is extended or adjusted under 35 U.S.C. 154(b) by 7 days.

(21) Appl. No.: 17/175,899

(22) Filed: Feb. 15, 2021

(65) Prior Publication Data

US 2021/0268761 A1 Sep. 2, 2021

(30) Foreign Application Priority Data

Feb. 28, 2020 (JP) .............................. JP2020-033688

(51) Int. Cl.
| B30B 15/26 | (2006.01) |
| G05B 19/06 | (2006.01) |
| B30B 15/14 | (2006.01) |

(52) U.S. Cl.
CPC ............ *B30B 15/148* (2013.01); *B30B 15/26* (2013.01); *G05B 19/06* (2013.01); *G05B 2219/2622* (2013.01); *G05B 2219/37545* (2013.01)

(58) Field of Classification Search
CPC ....... B30B 15/148; B30B 15/26; B30B 1/186; B30B 15/0041; B30B 15/0094;
(Continued)

(56) References Cited

U.S. PATENT DOCUMENTS

| 4,633,720 A | 1/1987 | Dybel et al. |
| 4,987,528 A | 1/1991 | O'Brien |

(Continued)

FOREIGN PATENT DOCUMENTS

| EP | 0612992 A2 | 8/1994 |
| JP | 6-15495 A | 1/1994 |

(Continued)

OTHER PUBLICATIONS

Tomohiro Kuroda, "A Method for Quickly Searching Similar Waveform Patterns in Historical Process Data", 2016, Yokogawa Technical Report, vol. 59 No. 1 (Year: 2016).*

(Continued)

*Primary Examiner* — Kenneth M Lo
*Assistant Examiner* — Jonathan Michael Skrzycki
(74) *Attorney, Agent, or Firm* — Nath, Goldberg & Meyer; Jerald L. Meyer; Stanley N. Protigal

(57) ABSTRACT

A pressing apparatus 1 includes a storage 27 that stores a plurality of actual data which are load data which was actually measured and which are configured of a first information and a second information, and a plurality of reference data which is a reference for the load data, an adjustor 23 that expands and contracts the first information of at least one of an actual data pattern which is based on the plurality of the actual data stored in the storage 27 and an reference data pattern based on the plurality of the reference data stored in the storage 27 to correspond with each other, and a determiner 24 that determines appropriateness of a load applied to the ram 9 in a pressing operation based on a similarity of the actual data pattern adjusted by the adjustor 23 and the reference data pattern adjusted by the adjustor 23.

5 Claims, 7 Drawing Sheets

(58) Field of Classification Search
CPC ......... B30B 1/18; B30B 15/281; G05B 19/06;
G05B 2219/2622; G05B 2219/45142;
G05B 2219/37545; D21F 3/06
See application file for complete search history.

(56) References Cited

U.S. PATENT DOCUMENTS

| | | |
|---|---|---|
| 2015/0068412 A1 | 3/2015 | Yanagi et al. |
| 2015/0068414 A1 | 3/2015 | Nakano et al. |
| 2016/0263854 A1 | 9/2016 | Suzuki |
| 2018/0043649 A1* | 2/2018 | Kurokawa ............. G05B 15/02 |
| 2018/0260656 A1* | 9/2018 | Ohkubo ................. G06F 17/18 |
| 2020/0047442 A1 | 2/2020 | Law et al. |

FOREIGN PATENT DOCUMENTS

| | | | |
|---|---|---|---|
| JP | 2002066798 A | 3/2002 | |
| JP | 2008119737 A | 5/2008 | |
| JP | 2015-88154 A | 5/2015 | |
| JP | 6623977 B2 * | 3/2018 | .............. Y02P 90/30 |

OTHER PUBLICATIONS

Extended European Search Report dated Jul. 19, 2021 corresponding to application No. 21153981.2-1017.

\* cited by examiner (a) Reference Waveform R (b) Actual Waveform S (a1) Desired part Q of Actual Waveform S (a2) Target Waveform Y (b1) Reference Waveform R (b2) Reference Waveform X

PRESSING APPARATUS THAT DETECTS ABNORMAL PRESSING THROUGH EXPANDING AND CONTRACTING INFORMATION OVER TIME OR POSITION

CROSS-REFERENCE TO RELATED APPLICATION

This application is based upon and claims the benefit of priority from Japan Patent Application No. 2020-033688, filed on Feb. 28, 2020, the entire contents of which are incorporated herein by reference.

FIELD OF INVENTION

The present embodiments relate to a pressing apparatus that presses a target.

BACKGROUND

A pressing apparatus which vertically moves a ram and presses a target by driving devices such as a servomotor.

SUMMARY OF INVENTION

Problems to be Solved by Invention

Since a pressing apparatus performs pressing to a target in high pressure, driving devices such as a motor, and driving equipment such as a ram which presses the target and a ball screw which drives the ram frequently get damaged or deteriorated. The driving devices and the driving equipment which are damaged or deteriorated are replaced by repairing operation done by operators. There is a problem that if products that are the pressing target are not pressed as reference values, quality of the product cannot be ensured.

Therefore, it is desirable to perform pressing operation while checking whether pressurization was performed correctly as the reference value or not.

The present disclosure is provided to address the above-described problem, and the objective is to provide a pressing apparatus that can check whether pressurization to products which are pressurization target of said pressing apparatus was performed correctly as the reference value or not.

Means to Solve the Problem

A pressing apparatus of the present disclosure includes the following features.

(1) a storage that stores a plurality of actual data which are load data which was actually measured and which are configured of a first information which indicates a position of a ram or an operation time of the ram and a second information which indicates a load of the ram corresponding to the first information, and a plurality of reference data which is a reference for the load data.

(2) an adjustor that expands and contracts the first information of at least one of an actual data pattern which is based on the plurality of the actual data stored in the storage and an reference data pattern based on the plurality of the reference data stored in the storage to correspond with each other.

(3) a determiner that determines appropriateness of a load applied to the ram in a pressing operation based on a similarity of the actual data pattern adjusted by the adjustor and the reference data pattern adjusted by the adjustor.

The pressing apparatus of the present disclosure may include the following configuration.

(1) the adjustor expands and contracts the first information of at least one of the actual data pattern and the reference data pattern based on a square of a distance between the actual data in the actual data pattern and the reference data corresponding to the actual data in the reference data pattern.

(2) the actual data pattern is configured of a value which indicates a distance between a first reference point in the actual data and the plurality of the actual data, and the reference data pattern is configured of a value which indicates a distance between a second reference point in the reference data and the plurality of the reference data.

(3) the determiner determines a similarity of a desired part selected by a user among the actual data pattern and the reference data pattern.

(4) the adjustor expands and contracts the first information of at least one of the actual data pattern and the reference data pattern by a dynamic programming.

Effect of Invention

According to the present disclosure, since the similarity of the actual data pattern configured of the plurality of the actual data that are the actually measured load data and the reference data pattern configured of the plurality of the reference data that are the reference for the load data is evaluated to precisely determine the deterioration condition of the pressing apparatus, the pressing apparatus that can check whether pressurization to products which are pressurization target of the pressing apparatus was performed correctly as the reference value or not.

According to the present disclosure, since the similarity of an actual waveform or the actual data pattern of the load applied to the ram and a reference waveform or the reference data pattern that are the references are evaluated, an abnormality in the load applied to the ram can be more precisely determined than a case in which the abnormality in the load applied to the ram is determined by a range of the actually measured value. In addition, according to the present disclosure, the abnormality in the load applied to the ram can be precisely determined regardless of a pressurization position of the ram, the starting time of the pressurization operation of the ram, and the operation speed of the ram.

DESCRIPTION OF PREFERRED EMBODIMENT

First Embodiment

[1-1. Schematic Configuration]

In below, a pressing apparatus 1 of the present embodiment will be described by referring to FIGS. 1 and 2.

Figure 1:
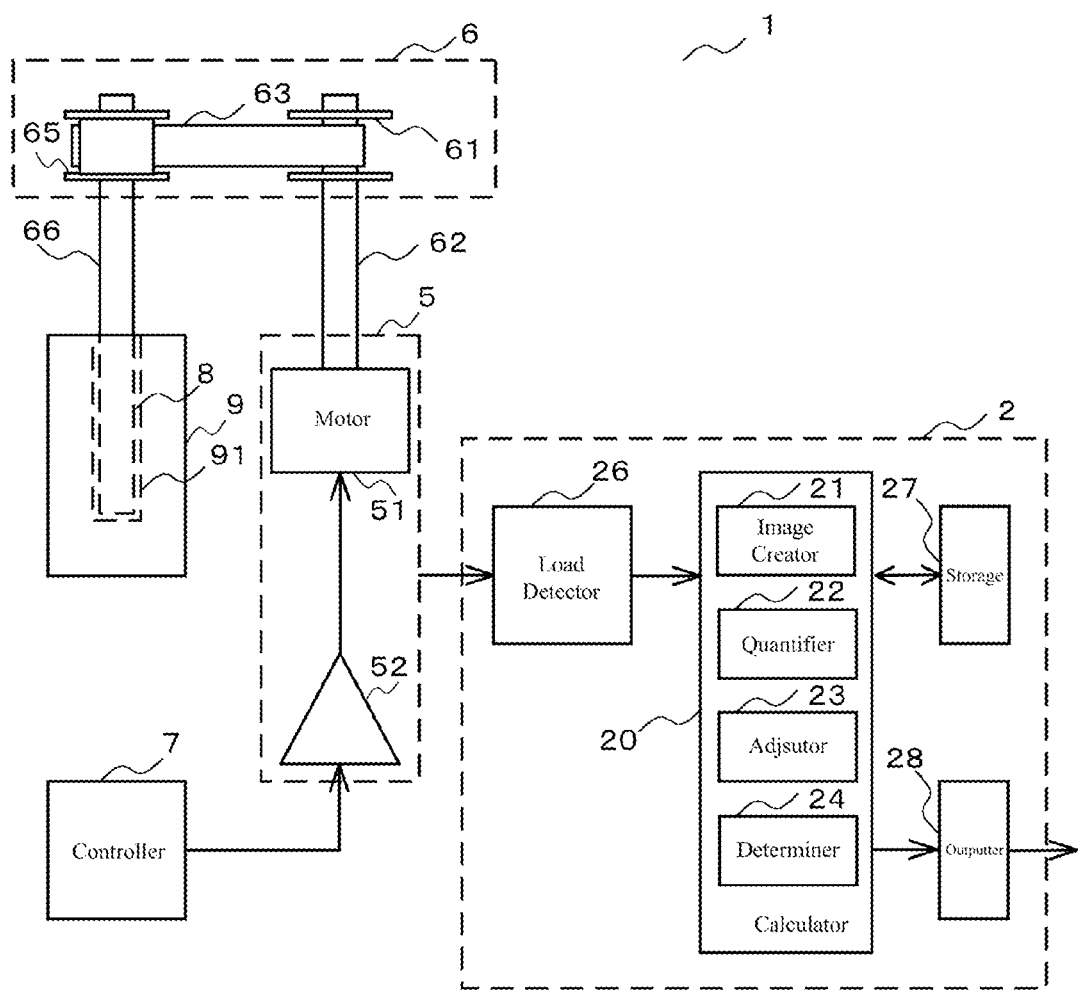
FIG. 1 is a block diagram illustrating a structure of a pressing apparatus according to a first embodiment.
Figure 2:
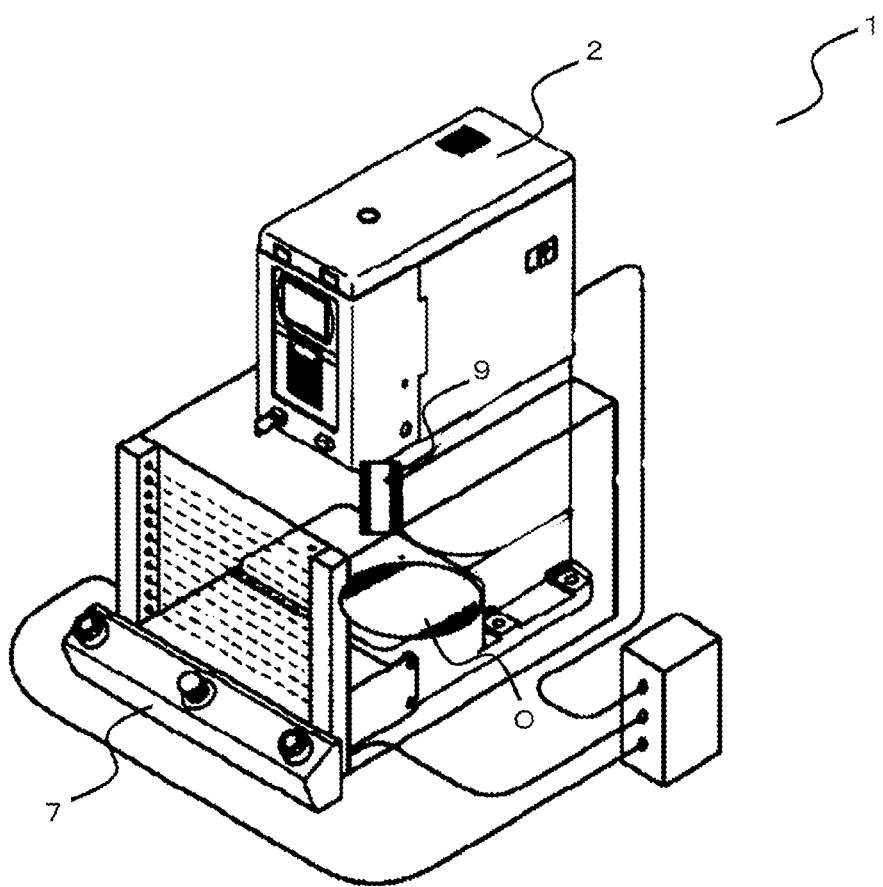
FIG. 2 is a perspective view illustrating an appearance of the pressing apparatus according to the first embodiment.
Figure 3:
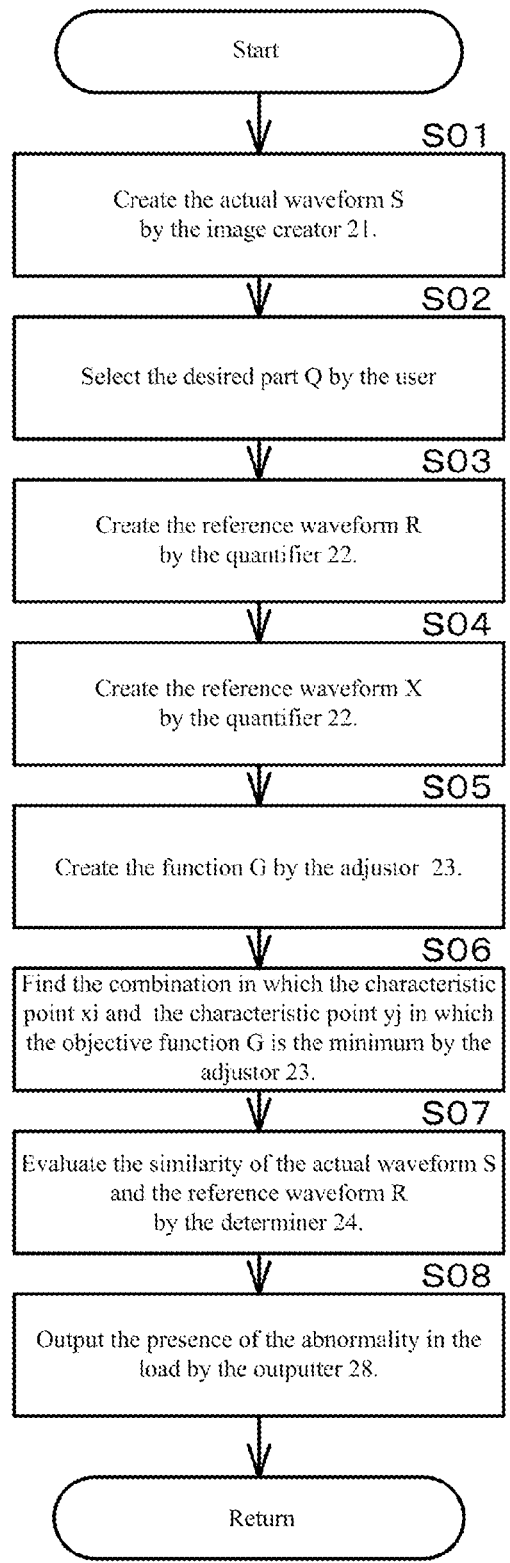
FIG. 3 is a diagram illustrating a program flow of a calculator of the pressing apparatus according to the first embodiment.
Figure 4:
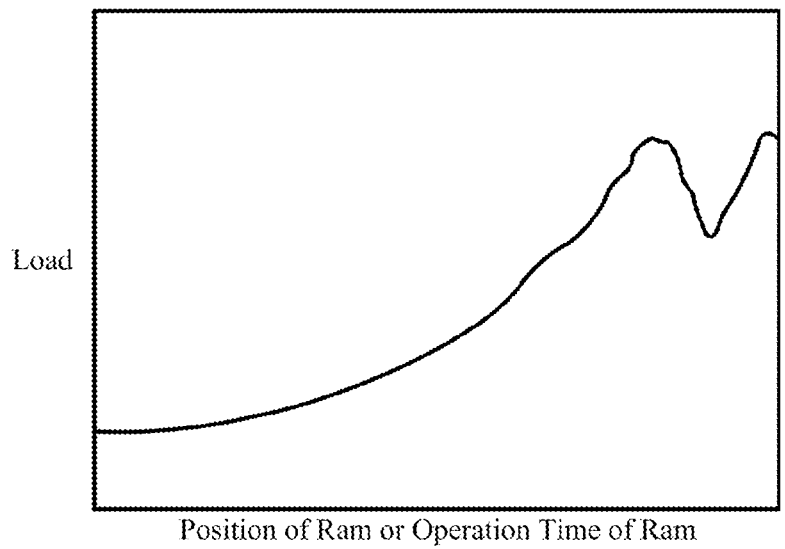
FIG. 4 is a diagram describing an operation of an image creator of the pressing device according to the first embodiment.
Figure 4:
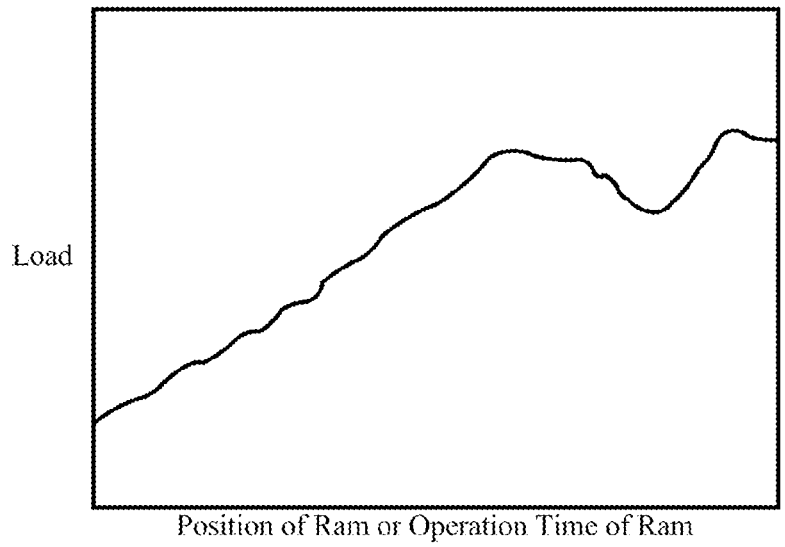

As illustrated in FIGS. 1 and 2, the pressing apparatus 1 includes a ram 9 configured by a block such as iron material, a ball screw 8 configured by a male screw, a transmitter 6 which driving force to rotate the ball screw 8, a driver configured by, for example, a servo motor, an abnormality detector 2 configured by, for example, a microcomputer, and a controller 7 configured by a switching circuit.

The ram 9 has a female screw 91 which matches with the ball screw 8 in the interior thereof, and moves vertically by rotation of the ball screw 8 to press a target O. The ball screw 8 is connected to the transmitter 6 via an axis 66. The ball screw 8 rotates by rotation of the axis 66.

The driver 5 includes a motor 51 which has driving force and a driving amplifier 52 which supplies current to the motor 51. The driving amplifier 52 is connected to the controller 7 and is instructed to supply or stop the current to the motor 51. The controller is controlled by the controller. The motor 51 and the driving amplifier forms the servo motor. The motor 51 is connected to the transmitter 6 via an axis 62. The motor 51 rotates the axis 62.

The transmitter 6 includes a pulley 65 fixed to the axis 66 and a pulley 61 fixed to the axis 62. The pulley 65 is connected to the pulley 61 via a belt 63 formed in a ring-shape and is driven. The driving force by the rotation of the driver 5 is transmitted in an order of the axis 62, the pulley 61, the belt 63, the pulley 65, and the axis 66 and rotates the ball screw 8.

The abnormality detector 2 includes a calculator 20 formed by a microcomputer, a load detector 26 formed by, for example, a load sensor, a storage 27 formed by, for example, a semiconductor, and an outputter 28 formed by, for example, a display, a printer, and a communication interface.

The load detector 26 is connected to the driver 5 and detects the driving force to drive the ball screw 8. The driving force to drive the ball screw 8 is converted to a load applied to the ram 9 and is transmitted to the calculator 20.

The storage 27 stores a reference data DR and a reference wave form R. The reference data DR is configured of a first information indicating a position of the ram 9 or an operation time of the ram 9, and a second information indicating a load of the ram 9 in a normal state corresponding to the first information. The reference waveform R is a waveform which is the reference data DR transformed into 2D. The reference data DR and the reference waveform R indicate a relationship between the position of the ram 9 or the operation time of the ram 9, and a load applied to the ram 9 in the normal state in the pressing operation. The reference data DR and the reference waveform R is a reference to determine a deterioration condition of the ram 9 to which the load is applied.

In addition, the storage 27 stores an actual data DS and an actual waveform S. The actual data DS is configured of the first information indicating the position of the ram 9 or the operation time of the ram 9, and the second information indicating the load of the ram 9 corresponding to the first information. The actual waveform S is a waveform which is the actual data DS transformed into 2D.

The calculator 20 detects the abnormality in the driver 5 and the ball screw 8 based on the load applied to the ram 9 transmitted from the load detector 26 by the below calculation process. The calculator 20 includes an image creator 21, a quantifier 22, an adjustor 23, and a determiner 24. The image creator 21, the quantifier 22, the adjustor 23, and the determiner 24 are formed by software modules or hardware in the microcomputer forming the calculator 20.

The image creator 21 creates the actual waveform S of the load data indicating the relationship between the position of the ram 9 or the operation time of the ram 9 in the pressing operation and the actual load applied to the ram 9, and the reference waveform R indicating the relationship between the position of the ram 9 or the operation time of the ram 9 and the load applied to the ram 9 that would be the reference.

The quantifier 22 calculates and quantifies a distance between a plurality of points s and a reference point q of the actual waveform S. In addition, the quantifier 22 calculates and quantifies a distance between a plurality of points r and a reference point p of the reference waveform R. Furthermore, the quantifier 22 may calculate and quantify the plurality of the points s and the reference point q based on the actual data DS stored in the storage 27. The quantifier 22 may calculate and quantify the plurality of the points r and the reference point p based on the reference data DR stored in the storage 27.

The adjustor 23 expands and contracts the first information of at least one of the actual waveform S and the reference waveform R indicating the position of the ram 9 or the operation time of the ram 9, to adjust the first information. The actual waveform S indicates an actual data pattern PS which is a pattern of the actual data DS stored in the storage 27. The reference waveform R indicates a reference data pattern PR which is a pattern of the reference data DR stored in the storage 27.

The adjustor 23 creates a function G indicating a relationship between a component y which is a quantified point s configuring the actual waveform S and a component x which is a quantified point r configuring the actual waveform R. $g(i,j)$ according to Formula 1, $ld(i,j)$ according to Formula 2, $e(i,j)$ according to Formula 3, and $G(I,j)$ according to Formula 4 described below are created as the function G by the adjustor 23. The adjustor 23 expands and contracts the actual waveform S and the reference waveform R based on the created function G.

The adjustor 23 may expand and contract the first information of at least one of the actual data pattern PS and the reference data pattern PR indicating the position of the ram 9 or the operation time of the ram 9 by the actual data DS and the reference data DR stored in the storage 27, to adjust the first information so that the actual data pattern PS and the reference data pattern PR correspond with each other.

The determiner 24 evaluates a similarity of the actual waveform S and the reference waveform R which are expanded and contracted based on the function G by the adjustor 23 and determines the abnormality in the load applied to the ram 9 in the pressing operation.

The outputter 28 outputs the abnormality determined by the determiner 23 of the calculator 20 to the operator, for example, by a display, a printing, and a communication telegram.

[1-2. Action]

Next, actions of the pressing apparatus in the present embodiment is described based on FIGS. 1 to 7. The calculator 20 is configured of microcomputer and performs operations according to programs indicated in FIG. 3 stored therein.

The driver 5 is controlled by the controller 7 by the operator and is operated each time different targets O are pressed. An output torque of the driver 5 becomes excessive compared to the normal state when the motor 51 is deteriorated or when the ball screw 8 is deteriorated.

The load detector 26 of the abnormality detector 2 sequentially detects the output torque that is the driving force to drive the ball screw 8 during the time in which the pressing operation is performed by the driver 5. For example, the load detector 26 detects the driving force to drive the ball screw 8 for every 100 milliseconds, calculates the load applied to the ram 9, and transmits the result to the calculator 20.

The storage 27 of the abnormality detector 2 stores the reference data DR and the reference waveform R that would be the reference for the load applied to the ram 9. The reference waveform R is a 2D waveform that would be the reference to determine the deterioration condition of the load applied to the ram 9 created based on the reference data DR. The reference data DR and the reference waveform R is set and stored in the storage 27 of the abnormality detector 2 by the operator at the time of, for example, installing the pressing apparatus 1. For example, as illustrated in FIG. 4(a), the reference data DR and the reference waveform R indicates the relationship between the position of the ram 9 or the operation time of the ram 9 in the pressing operation and the load applied to the ram 9 in the normal state.

The calculator 20 sequentially receives the load applied to the ram 9 from the load detector 26 in the time when the pressing operation is performed by the driver 5. Firstly, the calculator 20 creates the actual waveform S of the load data indicating the relationship between the position of the ram 9 or the operation time of the ram 9 and the actual load applied to the ram 9 by the image creator 21 (step S01). An example of the created actual waveform is illustrated in FIG. 4(b).

In FIGS. 4(a) and 4(b), the horizontal axis of the graph indicates the position of the ram 9 or the operation time of the ram in the pressing operation. The vertical axis of the graph indicates the load applied to the ram 9. The ram 9 descends as the pressing operation starts and contacts the target O such that the load applied the ram 0 increases. After a short time, the load applied to the ram 9 becomes maximum.

Then, the load applied to the ram 9 decreases once. The ram 9 further continues the pressing operation, the load applied to the ram 9 increases again to become maximum again.

As described above, the actual waveform S indicates the relationship between the position of the ram 9 or the operation time of the ram 9 in the pressing operation and the actual load applied to the ram 9 by 2D waveform.

Figure 5:
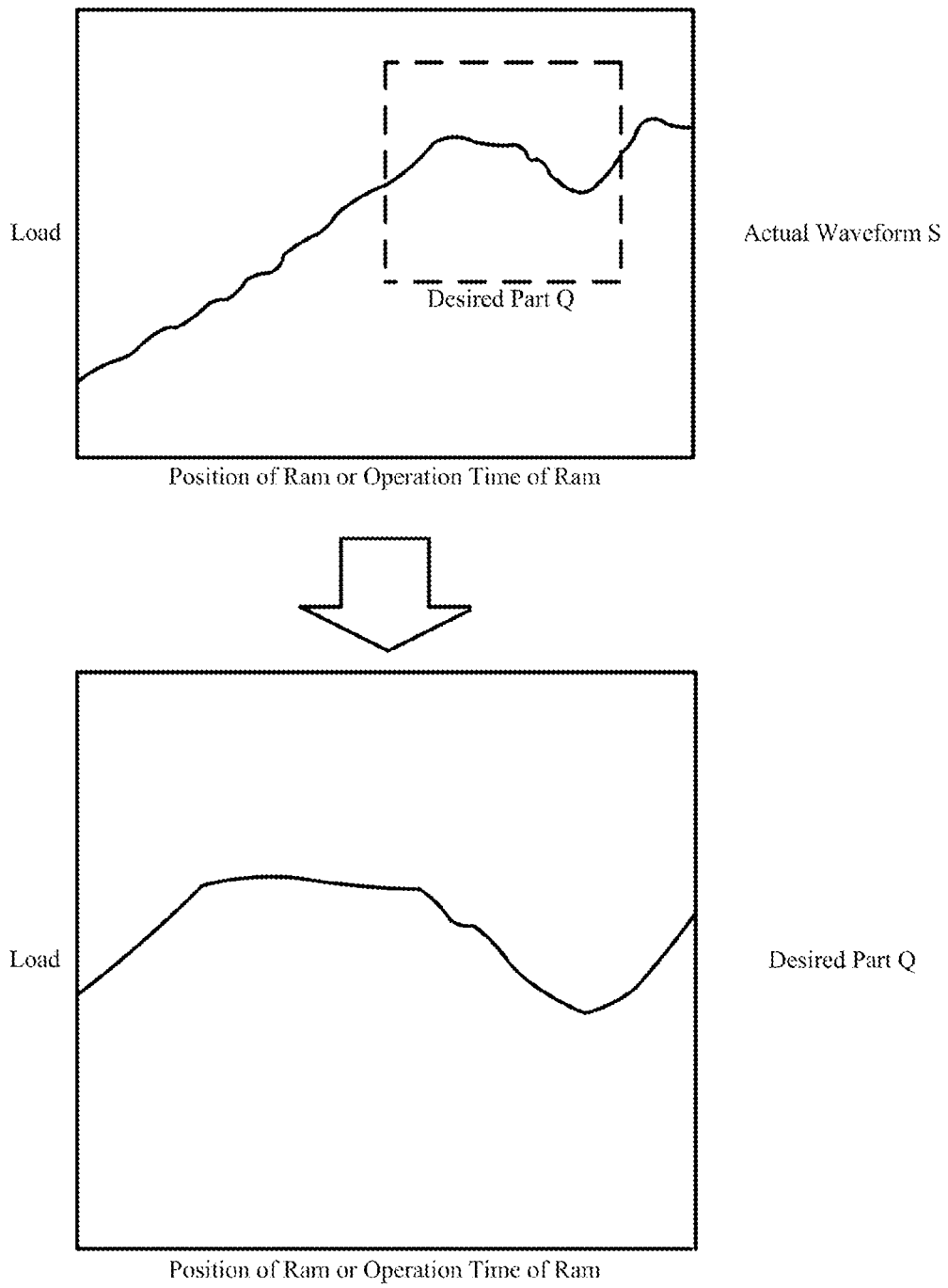
FIG. 5 is a diagram describing a selection of an actual waveform by a user of the pressing device according to the first embodiment.

Next, the desired part Q is selected from the actual waveform S created by the image creator 21 by the user (step S02). The user selects the desired part Q among the actual waveform S created by the image creator 21 by an input device such as a mouse. FIG. 5 illustrates the desired part Q selected by the user from the actual waveform S.

Next, the calculator 20 quantifies the points configuring the actual waveform S created by the image creator 21 and creates the component y by the quantifier 15 22. The component y is created based on the distance between the points in the actual waveform S and the reference point q in the actual waveform S. As the points, a continuous point configuring a graph according to the actual waveform S or a plurality of characteristic points 20 configuring graph according to the actual waveform S are selected.

In detail, the component y is created based on the distance between the point s in the desired part Q in the actual waveform S selected by the user in step S02 and the reference point q in the actual waveform S. In one example, an initial point of the actual waveform S is selected as the reference point q.

Figure 6:
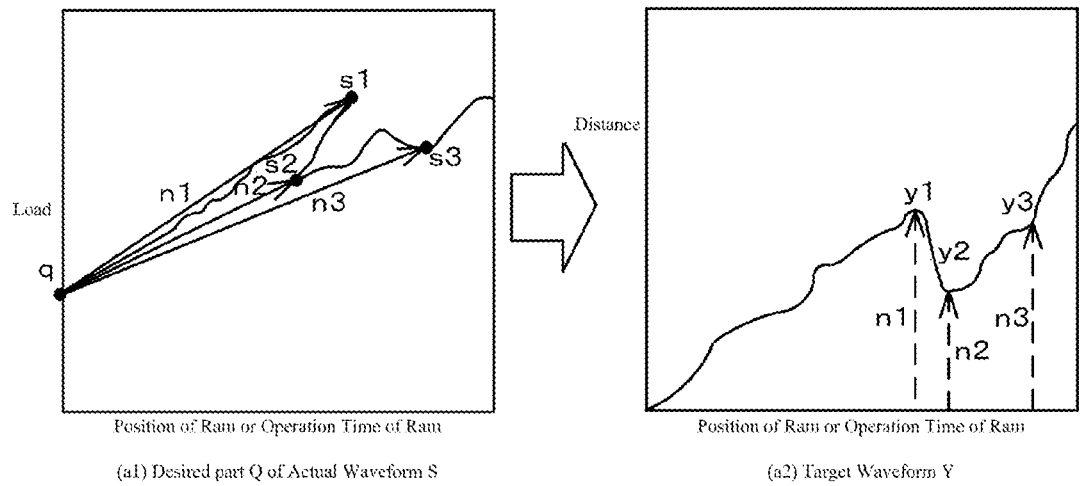
FIG. 6 is a diagram describing an operation of a quantifier of the pressing device according to the first embodiment.
Figure 6:
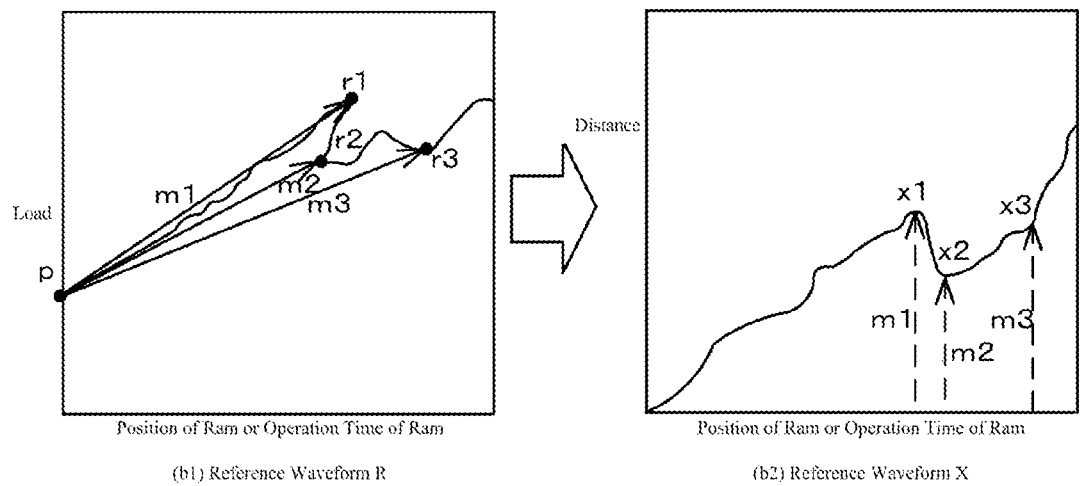

As illustrated in FIG. 6(a1), the calculator calculates the distance n1, n2, n3, . . . , between a plurality of the points s1, s2, s3, . . . , in the desired part Q in the actual waveform S selected by the user in step S02, and the reference point q by the quantifier 22. As illustrated in FIG. 6(a2), the calculator 20 creates a target waveform Y having the components y1, y2, y3, . . . , based on the distance n1, n2, n3, . . . , between the plurality of the points s1, s2, s3, . . . , and the reference point q by the quantifier 22 (step S03). In FIG. 6(a2), the horizontal axis is the position of the ram 9 or the operation time of the ram 9 in the pressing operation, and the vertical axis is the distance n1, n2, n3, . . . , between the plurality of the points s1, s2, s3, . . . , and the reference point q.

The target waveform Y corresponds to the actual data pattern PS based on the plurality of the actual data DS in the claims. The actual data DS corresponds to the point s in the actual waveform S. The reference point q in the actual waveform S corresponds to the first reference point in claims.

Meanwhile, the reference waveform R that would be the reference for the load applied to the ram 9 is stored in the storage 27. The calculator 20 calculates the distance m1, m2, m3, . . . , between a plurality of the points r1, r2, r3, . . . , in the reference waveform R illustrated in FIG. 6(b1) and the reference point p by the quantifier 22. As illustrated in FIG. 6(b2), the calculator 20 creates a reference waveform X having the components x1, x2, x3, . . . , based on the distance m1, m2, m3, . . . , between the plurality of the points r1, r2, r3, . . . , and the reference point p by the quantifier 22 (step S04). In FIG. 6(b2), the horizontal axis is the position of the ram 9 or the operation time of the ram 9 in the pressing operation, and the vertical axis is the distance m1, m2, m3, . . . , between the plurality of the points r1, r2, r3, . . . , and the reference point p.

The reference waveform X corresponds to the reference data pattern PR based on the plurality of the reference data DR in the claims. The reference data DR corresponds to the point r in the reference waveform R. The reference point p in the reference waveform R corresponds to the second reference point in claims.

Next, the calculator 20 creates the function G based on the distance between the component y of the target waveform Y according to the actual waveform S created by the image creator 21, and the component x of the reference waveform X according to the reference waveform R (step S05).

The calculator 20 calculates 2D arrangement of a minimum accumulated distance from the start point to the reference waveform X and the target waveform Y using Formula 1 by the adjustor 23. In Formula 1, i indicates the i-th ($i=1, 2, \ldots, i$) component x of the reference waveform X. The reference waveform X is configured by the components x1, x2, . . . , xi. In Formula 1, j indicates the j-th ($j=1, 2, \ldots, j$) component y of the target waveform Y. The target waveform Y is configured by the components y1, y2, . . . , yj. The minimum accumulated distance g is calculated by the below Formula 1. $g(i,j)$ according to Formula 1 and $ld(i,j)$ according to Formula 2 are created as the function G by the quantifier 22 of the calculator 20.

$$g(i, j) = \min \begin{cases} g\ (i-1, j-2) * 2 * ld(i, j-1) &: (a) \\ g\ \ \ \ (i-1, j-1) * ld(i, j) &: (b) \\ g\ (i-2, j-1) * 2 * ld(i-1, j) &: (c) \end{cases} * ld(i, j) \quad \text{Formula 1}$$

In Formula 1, a local distance ld is calculated by the below Formula 2 based on the square of the distance between the component yj of the target waveform Y according to the actual waveform S created by the image creator 21 and the component xi of the reference waveform X according to the reference waveform R. the local distance ld may be calculated based on the actual data and the reference data stored in the storage 27.

$$ld(i,j) = (x(i) - y(j))^2 \quad \text{Formula 2}$$

The local distance ld is in direct proportion to the square of the distance between the component xi and the component yj and can keenly evaluate the distance between both. An accuracy evaluating the similarity between the target waveform Y according to the actual waveform S and the reference waveform X according to the reference waveform R is determined.

An accumulated value e of the separation distance between the target waveform Y according to the actual waveform S and the reference waveform X according to the reference waveform R is calculated by the below Formula 3. The accumulated value e(i,j) of the separation distance is the accumulated distance from the reference point p or q to the point g(i,j).

$$e(i, j) = \begin{cases} e\ (i-1, j-2) + 3 & \text{if } (a) \\ e\ (i-1, j-1) + 2 & \text{if } (b) \\ e\ (i-2, j-1) + 3 & \text{if } (c) \end{cases} \quad \text{Formula 3}$$

$$G(i) = \frac{g(i, j)}{e(i, j)} \quad \text{Formula 4}$$

In addition, the local minimum value G is calculated by Formula 4. The accumulated value e(i,j) of the separation distance to the component xi according to Formula 3 and the local minimum value G according to Formula 4 are created as the function G by the quantifier 22.

The adjustor 23 expands and contracts the actual waveform S or the reference waveform R based on the function G according to Formula 1.

The adjustor 23 may expand and contract the first information of at least one of the actual data pattern PS and the reference data pattern PR indicating the position of the ram 9 or the operation time of the ram 9 by the actual data DS and the reference data DR stored in the storage 27, to adjust the first information so that the actual data pattern PS and the reference data pattern PR correspond with each other.

The calculator 20 expands and contracts the first information of at least one of the actual data pattern PS according to the actual waveform S and the reference data pattern PR according to the reference waveform R indicating the position of the ram 9 or the operation time of the ram 9, to adjust the first information by a dynamic programming by the adjustor 23.

Based on accumulated value e(i,j) of the separation distance between the component yj of the target waveform Y according to the actual waveform S and the component xi of the reference waveform X according to the reference waveform R, combinations in which J=ui is met, that is an objective function F according to the below Formula 5 having the association between the component yj of the target waveform Y and the component xi of the reference waveform X would be minimum, is found (step S06).

$$\min F = \min_{\substack{u1, \ldots, ui(i,j) \\ 0 \le u_i - u_{i-1} \le 2}} \sum_{i=1}^{I} di(ui) \quad \text{Formula 5}$$

Next, the calculator 20 evaluates the similarity of the actual waveform S and the reference waveform R, that is, evaluates whether the local minimum value G according to Formula 4 is a, b, or c in the Formula 3 using a graph in which the horizontal axis is i and the vertical axis is j by the determiner 24.

The calculator 20 evaluates the similarity of the actual waveform S created by the image creator 21 and the reference waveform R based on the reference data that would be the reference for the load applied to the ram 9 based on the function G created by the quantifier 22, and determines the presence of the abnormality in the load applied to the ram 9 in the pressing operation. The similarity of the actual waveform S and the reference waveform R is evaluated based on the accumulated value e(i,j) of the separation distance between the component yj of the target waveform Y according to the actual waveform S and the component xi of the reference waveform X according to the reference waveform R The calculator 20 evaluates the similarity of the actual waveform S and the reference waveform R using the dynamic programming by the determiner 24. The calculator 20 expands and contracts the position of the ram 9 or the operation time of the ram 9 in the pressing operation corresponding to the horizontal axis of the actual waveform S or the reference waveform R, and determines the presence of positional relationship and the level of expansion and contraction of the target waveform Y and the reference waveform R that is determined to have the similarity.

Figure 7:
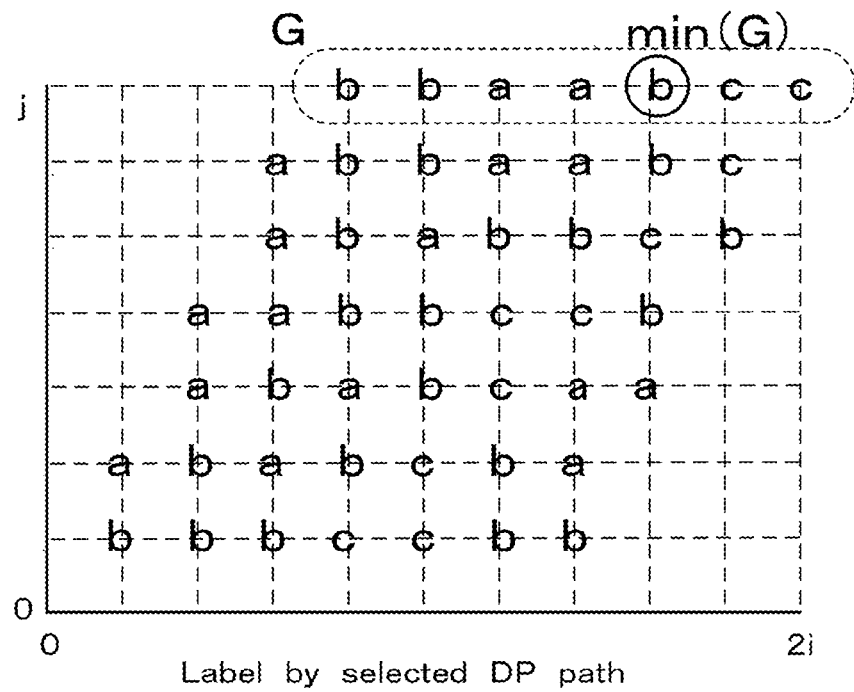
FIG. 7 is a diagram describing an operation of a determiner of the pressing device according to the first embodiment.
Figure 7:
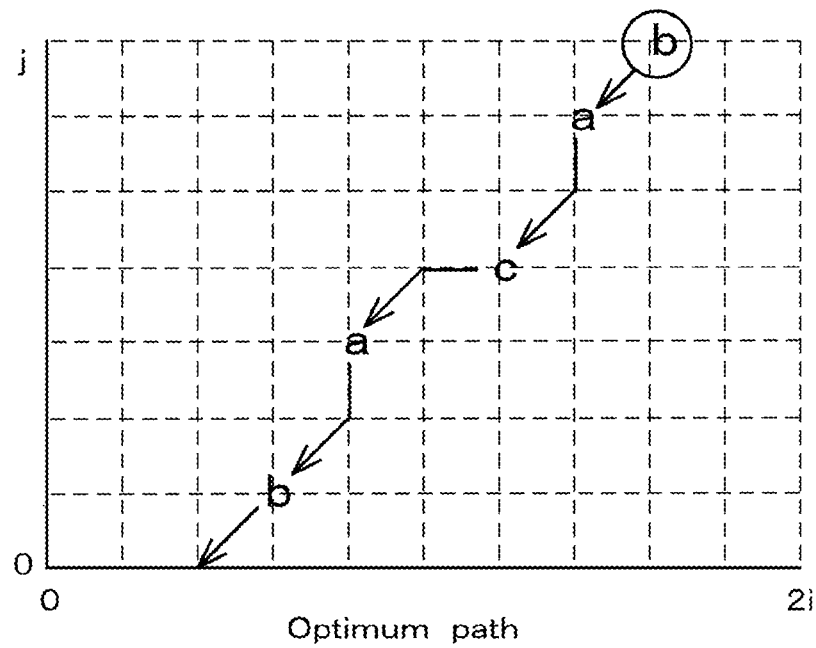

In detail, in a process map illustrated in FIG. 7, the point in which the local minimum value G in Formula 4 is the minimum is set as the start point, a route in which a distance from the start point to j=0 would be the shortest is calculated, and the similarity is evaluated by the value of this distance of the route. Based on a predetermined threshold, the similarity of the target waveform Y according to the actual waveform S and the reference waveform X according to the reference waveform R is determined. If the distance of the route is equal to or more than the threshold, it is determined that the actual waveform S and the reference waveform X are similar.

If there is the positional relationship and the level of expansion and contraction of the target waveform Y and the reference waveform R that is determined to have the similarity when the position of the ram 9 or the operation time of the ram 9 in the pressing operation corresponding to the horizontal axis of the target waveform Y according to the actual waveform S and the reference waveform X according to the reference waveform R is expanded and contracted, it is determined that the actual waveform S and the reference waveform X have similarity.

When it is determined that the actual waveform S and the reference waveform X have similarity, the calculator 20 determines that there is no abnormality in the load applied to the ram 9. When it is not determined that the actual waveform S and the reference waveform X have similarity, the calculator 20 determines that there is an abnormality in the load applied to the ram 9.

The calculator 20 outputs the presence of the abnormality in the load applied to the ram 9 from the outputter 28 by, for example, a display, a printer, and a communication interface (step S08).

The action of the pressing apparatus 1 is as described above.

[1-3. Effect]

(1) According to the present embodiment, since the pressing apparatus 1 expands and contracts the first information by the adjustor 23 to adjust the first information so that the actual data pattern based on the plurality of the actual data and the reference data pattern based on the plurality of the reference data correspond with each other, and determines the appropriateness of the load applied to the ram 9 in the pressing operation based on the actual data pattern adjusted by the adjustor 24 and the reference data pattern adjusted by the adjustor 24, the abnormality in the load applied to the ram 9 can be determined more precisely. According to the present embodiment, the abnormality in the load applied to the ram can be precisely determined regardless of the pressurization position of the ram 9, the starting time of the pressurization operation of the ram 9, and the operation speed of the ram.

According to the present embodiment, since the quantifier 22 creates the function G indicating the relationship between the component y which is the quantified point s configuring the actual waveform S and the component x which is the quantified point r configuring the actual waveform R, the adjustor 23 expands and contracts at least one of the actual waveform S and the reference waveform R or at least one of the actual data pattern PS and the reference data pattern PR based on the function G created by the quantifier 23 to adjust them, and the determiner 24 evaluates the similarity of the adjusted actual waveform S and the adjusted reference waveform R or the similarity of the adjusted actual data pattern PS and the adjusted reference data pattern PR and determines the abnormality in the load applied to the ram 9 in the pressing operation, it is unnecessary to reset the data related to the reference data or the reference waveform that would be the reference for the load even when the target O that is the pressing target placed on the different position relative to the pressing apparatus 1.

(2) According to the present embodiment, since the adjustor 23 expands and contracts the first information of at least one of the actual data pattern PS and the reference data pattern PR based on the square of the distance between the actual data DS in the actual data pattern PS and the reference data DR corresponding to the actual data DS in the reference data pattern PR to adjust the first information, an error between the actual data pattern PS and the reference data pattern PR can be keenly evaluated.

Since the quantifier 22 creates the function G based on the square of the distance between the component y based on the actual waveform S and the component x based on the reference waveform R corresponding to the component y, and the determiner 23 evaluates the similarity of the actual waveform S and the reference waveform R based on the function G created by the quantifier 22, the abnormality in the load applied to the ram 9 can be determined more precisely. Since the function G is created by the square of the component y and the component x, an error between the actual waveform S and the reference waveform R can be keenly evaluated.

(3) According to the present embodiment, since the actual data pattern PS is configured of the value calculated by the quantifier 22, indicating the distance between the first reference point in the actual data DS and the plurality of the actual data DS calculated by the quantifier 22, and the reference data pattern PR is configured of the value calculated by the quantifier 22, indicating the distance between the second reference point in the reference data PR and the plurality of the reference data DR, the similarity of the actual data pattern PS and the reference data pattern PR can be precisely evaluated.

According to the present embodiment, since the component y is configured by the value indicating the distance between the point s in the actual waveform S and the reference point q in the actual waveform S, and the component x is configured by the value indicating the distance between the point r in the reference waveform R and the reference point p in the reference waveform R, the similarity of the actual waveform S and the reference waveform R can be precisely evaluated by the function G using the values. In addition, the similarity of the actual waveform S and the reference waveform R can be precisely evaluated even when there is a plurality of values for the actual waveform S and the reference waveform R as the load applied to the ram 9 relative to the position of the ram 9 and the operation time of the ram 9.

(4) According to the present embodiment, since the desired part Q is selected from the actual waveform S created by the image creator 21 by the user, and the quantifier 22 creates the function G in the desired part Q among the actual waveform S selected by the user, the characteristic part Q desired by the user in the actual waveform S indicating the relationship between the position of the ram 9 or the operation time of the ram 9 in the pressing operation and the actual load applied to the ram 9 can be extracted, and the abnormality in the load applied to the ram 9 can be determined more precisely.

(5) According to the present embodiment, since the determiner 23 evaluates the similarity of the actual waveform S and the reference waveform R or the similarity of the actual data pattern PS and the reference data pattern PR by the dynamic programming, the abnormality in the load applied to the ram 9 can be determined more precisely compared to the case in which the abnormality in the load applied to the ram 9 is determine by the actually measured values.

2. Second Embodiment

Although embodiments including modifications are described, these embodiments are merely presented as examples and are not intended to limit the scope of claims. These embodiments may be implemented in other various forms, and various omissions, replacements, and modifications may be performed without departing from the range of the abstract of invention. These embodiments and the modifications thereof are included in the scope and abstract of invention, and similarly, included in invention described in the scope of claims and equivalent thereto. Below is one example.

(1) In the above embodiment, although the actual waveform S of the load data indicating the relationship between the position of the ram 9 or the operation time of the ram 9 in the pressing operation and the actual load applied to the ram 9 is created by the image creator 21, the actual waveform S may be input from outside to the calculator 20.

(2) In the above embodiment, although the reference waveform R based on the reference data that would be the reference for the load applied to the ram 9 is set in the storage 27 in advance, the reference waveform R may be stored in the external storing device and may be input to the calculator 20 by, for example, communication.

(3) In the above embodiment, although the reference waveform R is set in the storage 27 in advance, and the reference waveform X is created based on the reference waveform R, the reference waveform may be set in the storage 27 in advance.

(4) In the above embodiment, although the function G created by the quantifier 22 is created based on the target waveform Y indicating the distance between the point s in the actual waveform S and the reference point q in the actual waveform S and the reference waveform X indicating the distance between the point r in the reference waveform R and the reference point q in the reference waveform R, the function G created by the quantifier 22 may be created based on the actual waveform S and the reference waveform X.

REFERENCE SIGN

1: pressing apparatus
2: abnormality detector
20: calculator
21: image creator
22: quantifier
23: adjustor
24: determiner
26: load detector
27: storage
28: outputter
5: driver
51: motor
52: driving amplifier
6: transmitter
61: pulley
62: axis
63: belt
64: pulley
66: axis
7: controller
8: ball screw
9: ram
91: male screw

The invention claimed is:

1. A pressing apparatus comprising:
a storage that stores a plurality of actual data which are load data which was actually measured and which are configured of a first information which indicates a position of a ram or an operation time of the ram and a second information which indicates a load of the ram corresponding to the first information, and a plurality of reference data which is a reference for the load data and comprised of the first information and the second information;
an adjustor that expands and/or contracts the first information of at least one of an actual data pattern which is based on the plurality of the actual data stored in the storage and a reference data pattern based on the plurality of the reference data stored in the storage to correspond with each other;
and a determiner that determines abnormality of a load applied to the ram in a pressing operation based on a similarity of the actual data pattern and the reference data pattern wherein the first information of at least one of the actual data pattern and the reference data pattern is expanded and/or contracted,
wherein in the case of the adjustor expanding and/or contracting the first information of only the actual data pattern, the determiner compares the adjusted actual data pattern to the unadjusted reference data pattern,
wherein in the case of the adjustor expanding and/or contracting the first information of only the reference data pattern, the determiner compares the adjusted reference data pattern to the unadjusted actual data pattern,
and wherein in the case of the adjustor expanding and/or contracting the first information of both the actual data pattern and the reference data pattern, the determiner compares the both of the adjusted reference data pattern and the adjusted actual data pattern; and
an output unit that outputs the abnormality determined by the determiner.

2. The pressing apparatus according to claim 1, wherein the adjustor expands and/or contracts the first information of at least one of the actual data pattern and the reference data pattern based on a square of a distance between the actual data in the actual data pattern and the reference data corresponding to the actual data in the reference data pattern.

3. The pressing apparatus according to claim 1, wherein:
the actual data pattern is configured of a value which indicates a distance between a first reference point in the actual data and the plurality of the actual data, and
the reference data pattern is configured of a value which indicates a distance between a second reference point in the reference data and the plurality of the reference data.

4. The pressing apparatus according to claim 1, wherein the determiner determines a similarity of a desired part selected by a user among the actual data pattern and the reference data pattern.

5. The pressing apparatus according to claim 1, wherein the adjustor expands and/or contracts the first information of at least one of the actual data pattern and the reference data pattern by a dynamic programming.

* * * * *